US011755306B2

(12) United States Patent
Castinado et al.

(10) Patent No.: US 11,755,306 B2
(45) Date of Patent: Sep. 12, 2023

(54) INTEGRATED ENTITY RESOURCE DISTRIBUTION DEVICE SET-UP AND DELIVERY PLATFORM

(71) Applicant: BANK OF AMERICA CORPORATION, Charlotte, NC (US)

(72) Inventors: Joseph Benjamin Castinado, North Glenn, CO (US); Lee Barry Frantz, Souderton, PA (US); Joseph William Pellar, Littleton, CO (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 350 days.

(21) Appl. No.: 17/162,281

(22) Filed: Jan. 29, 2021

(65) Prior Publication Data

US 2022/0245546 A1 Aug. 4, 2022

(51) Int. Cl.
*G06F 8/00* (2018.01)
*G06F 8/65* (2018.01)
*G06Q 10/0631* (2023.01)
*G06Q 10/0637* (2023.01)
(Continued)

(52) U.S. Cl.
CPC ............... *G06F 8/65* (2013.01); *G06F 9/445* (2013.01); *G06Q 10/06315* (2013.01); *G06Q 10/06375* (2013.01); *G06Q 20/202* (2013.01)

(58) Field of Classification Search
None
See application file for complete search history.

(56) References Cited

U.S. PATENT DOCUMENTS 9,361,595 B2 * 6/2016 Karve .............. G06Q 10/06315
9,489,647 B2 * 11/2016 Martinez ................... G06F 8/36
9,965,377 B1 * 5/2018 Russell ..................... G06F 8/71
(Continued)

OTHER PUBLICATIONS

Raposo, Duarte, et al. "Industrial IoT Monitoring: Technologies and Architecture Proposal." Sensors (Basel, Switzerland) 18.10 (2018). (Year: 2018).*

(Continued)

*Primary Examiner* — Gurkanwaljit Singh
(74) *Attorney, Agent, or Firm* — Moore & Van Allen PLLC; Nicholas C. Russell (57) ABSTRACT

Embodiments of the invention are directed to a system, method, or computer program product for an integrated entity resource distribution device set-up and deliver platform for distribution of devices to an entity for resource acceptance. An entity must be activated and on-boarded to accept resource acceptance and processing. The invention creates a platform for identification of entity needs with respect to resource acceptance devices. With this information the platform generates configured resource acceptance devices for the entity with correct components and sub-components. Furthermore, the system integrate software and firmware in an appropriate sequence onto resource acceptance devices components and sub-components. The platform then ties the software with the entity and the resource acceptance device identifiers to allow for resource distribution processing for the entity to intelligently provide correct loading and correlating of subcomponents onto a device without entity setup and integration with other merchant devices.

17 Claims, 4 Drawing Sheets

(51) Int. Cl.
*G06F 9/445* (2018.01)
*G06Q 20/20* (2012.01)

(56) References Cited

U.S. PATENT DOCUMENTS

| | | | | |
|---|---|---|---|---|
| 10,417,593 | B1* | 9/2019 | Norbeck, Jr. | G06F 16/9535 |
| 11,232,381 | B2* | 1/2022 | Marvin | G06N 5/02 |
| 2005/0289538 | A1* | 12/2005 | Black-Ziegelbein | G06F 8/61 |
| | | | | 717/177 |
| 2006/0005162 | A1* | 1/2006 | Tseng | G06F 8/64 |
| | | | | 717/102 |
| 2007/0240102 | A1* | 10/2007 | Bello | G06F 8/36 |
| | | | | 717/104 |
| 2008/0306798 | A1* | 12/2008 | Anke | G06F 8/61 |
| | | | | 705/7.26 |
| 2009/0171705 | A1* | 7/2009 | Bobak | G06Q 50/188 |
| | | | | 705/80 |
| 2009/0172149 | A1* | 7/2009 | Bobak | G06Q 10/06 |
| | | | | 709/224 |
| 2011/0126275 | A1* | 5/2011 | Anderson | G06F 9/455 |
| | | | | 726/8 |
| 2012/0179824 | A1* | 7/2012 | Jackson | H04L 41/5006 |
| | | | | 709/226 |
| 2014/0278623 | A1* | 9/2014 | Martinez | G06Q 10/06 |
| | | | | 705/7.12 |
| 2016/0055351 | A1* | 2/2016 | Barnes | G06F 16/951 |
| | | | | 726/34 |
| 2016/0055441 | A1* | 2/2016 | Rappoport | G06Q 20/20 |
| | | | | 705/7.25 |
| 2017/0280459 | A1* | 9/2017 | Ogrinz | H04W 24/08 |
| 2020/0090092 | A1* | 3/2020 | Cantley | G06Q 10/06315 |
| 2020/0184273 | A1* | 6/2020 | Jannink | G06F 18/214 |
| 2020/0401448 | A1* | 12/2020 | Cantley | G06F 9/545 |
| 2021/0158247 | A1* | 5/2021 | Dravneek | H04L 67/10 |
| 2021/0166178 | A1* | 6/2021 | Kehner | G06F 16/29 |

OTHER PUBLICATIONS

Wirén, Jan-Anders. "Data Centre Monitoring System Change for Company X." (2016). (Year: 2016).*

Lin, T. K. (2021). Client-centric orchestration and management of distributed applications in multi-tier clouds (Order No. 28770341). Available from ProQuest Dissertations and Theses Professional. (Year: 2021).*

Kayode, O. (2020). Machine learning approaches to improve security and performance monitoring of IoT devices (Order No. 28029941). Available from ProQuest Dissertations and Theses Professional. (Year: 2020).*

* cited by examiner

INTEGRATED ENTITY RESOURCE DISTRIBUTION DEVICE SET-UP AND DELIVERY PLATFORM

BACKGROUND

Entities desire to accept new resource acceptance or resource distribution technologies at their locations, such as accepting of digital resource distributions. When entities accept these types of resource acceptance technologies, the entity must be registered within a resource acceptance platform and provide resource routing information to the platform. This activation and on-boarding process. Currently there is no way to intelligently walk through correct loading and correlating of subcomponents onto a device and make it work correctly without entity setup and integration with other entity devices.

BRIEF SUMMARY

The following presents a simplified summary of all embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of all embodiments in a simplified form as a prelude to the more detailed description that is presented later.

Embodiments of the present invention address the above needs and/or achieve other advantages by providing apparatus (e.g., a system, computer program product, and/or other devices) and methods for an integrated entity resource distribution device set-up and deliver platform for distribution of devices to an entity or merchant. Entities want to typically provide new and modern resource acceptance at their location. Resource acceptance devices may be point-of-transaction (POT) devices for face-to-face transactions or for e-commerce, card not present, applications for online payments.

When the entity accepts those types of payments, the entity has to be identifiable on an entity payment platform. The platform must also have access to and be provided the entity payment routing information. This set up process for an entity is known as activation and on-boarding of the entity in order to accept a different or new type of resource acceptance, such as digital payments.

In order to perform the devices to accept various resources via a resource acceptance device, the device may need to have appropriate software and hardware installed in specific order in order to function. As such, several different types of resource acceptance devices may be generated depending on the type of entity (restaurant, on-line, brick-and-mortar, or the like) and where/how the entity may be using the device (behind counter, on counter, or the like). Once a type of resource acceptance device is determined, the device may be loaded to have multiple pieces of software on it prior to delivery to the entity.

The system platform instructs the sequence of installation of software and what software gets placed on what resource acceptance device when during the build and delivery process. The platform then ties the software with the entity and the resource acceptance device identifies that ties it directly to a financial institution to allow for price and processing. Currently, there is no way to intelligently walk through correct loading and correlating of subcomponents onto a device and make it work correctly without entity setup and integration with other merchant devices.

Embodiments of the invention relate to systems, methods, and computer program products for entity resource acceptance device set-up and distribution, the invention comprising: performing entity evaluation for resource acceptance devices; selecting resource acceptance devices for the entity and instruct software and firmware loading onto components and subcomponents of the selected resource acceptance devices, wherein the selected resource acceptance devices are determined based on the entity evaluation; confirming configured resource acceptance devices with instructed software and firmware and coordinate a merchant identification (MID) of the entity with a terminal identification (Terminal ID) of the resource acceptance device and with the instructed software and firmware for entity activation and on-boarding; recognizing live deployed configured resource acceptance devices at an entity location; performing continual monitoring and automatic patch and update deployment on the configured resource acceptance devices at the entity location for continued functionality; tracking usage of the configured resource acceptance devices including usage of components and sub-components of the configured resource acceptance devices; and providing recommendations on usage, modifications, and cost analysis for the configured resource acceptance devices.

In some embodiments, instructing software and firmware loading onto components and subcomponents of the selected resource acceptance further comprises instructing a timing and order of software and firmware loading.

In some embodiments, performing entity evaluation for resource acceptance devices further comprises identifying a location of the entity, a service industry of the entity, and resource acceptance device needs for the entity.

In some embodiments, the resource acceptance devices further comprise a device with components and subcomponents for accepting resources and initiating a payment processing to distribute resources to the entity.

In some embodiments, entity activation and on-boarding further comprises linking the entity to payment rails for completion of transactions and processing of payments via the resource acceptance devices.

In some embodiments, confirming configured resource acceptance devices further comprises testing the configured resource acceptance devices in an entity type environment to confirm the configured resource acceptance devices interaction with current entity devices and applications.

In some embodiment, providing recommendations on usage, modifications, and cost analysis further comprises providing recommendations based on the tracking of the usage of the configured resource acceptance devices to determine underperforming or overperforming configured resource acceptance devices in order to modify the select resource acceptance devices for the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Furthermore, embodiments of the present invention use the term "user" or "agent." It will be appreciated by someone with ordinary skill in the art that the user may be an individual, financial institution, corporation, or other entity that may have been involved in the instillation of software maintenance and/or wishes to view the progress of a maintenance deployment within the entity providing the system.

The term "maintenance update" or "maintenance fix" or "maintenance" as used herein may refer to any software instillation or update that may occur within an entity. This may include any updates, patches, fixes, programs, new instillations, new versions, or the like. The software may be installed in or for any portion of the entity. This may include instillation in any portion of an entity's information technology infrastructure, which may include any server environment, logical partition, database systems, software libraries, or the like. Furthermore, at any given time one or more maintenance rollouts may occur at different phases within the entity.

In accordance with embodiments of the invention, the term "information technology" as used herein refers to the totality of interconnecting hardware and software that supports the flow and processing of information. Information technology include all information technology resources, physical components, and the like that make up the computing, internet communications, networking, transmission media, or the like of an entity.

A "technology activity" may include a transaction for a product or service from a merchant. A "transaction" or "resource distribution" refers to any communication between a user and an entity to transfer funds for the purchasing or selling of a product or service. A transaction may refer to a purchase of goods or services, a return of goods or services, a payment transaction, a credit transaction, or other interaction involving a user's account. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Furthermore the term resource distribution or resource acceptance may be the transmission of resources, such as money, for the exchange of a good or service. The term resource distribution device or resource acceptance device may be a point-of-transaction (POT) device and/or a software application for acceptance of a payment in a card not present situation or an online purchase.

In various embodiments, the POT may be or include a merchant machine and/or server and/or may be or include the mobile device of the user may function as a point of transaction device. The embodiments described herein may refer to the use of a transaction, transaction event or point of transaction event to trigger the steps, functions, routines or the like described herein. In various embodiments, occurrence of a transaction triggers the sending of information such as alerts and the like. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a Wi-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to a technology activity such as an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), an entertainment device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

Further, the term "payment credential" or "payment vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an ATM or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like). The payment vehicle may be an unrestricted resource. Unrestricted resources, as used herein may be any resource that is not restricted for transaction. In this way, the unrestricted resources may be applied to any transaction for purchase of a product or service.

In some embodiments, information associated with the purchase transaction is received from a POT including a point-of-sale (POS) terminal during a transaction involving a consumer and a merchant. For example, a consumer checking out at a retail merchant, such as a grocer, may provide to the grocer the one or more goods or products that a customer is purchasing together with a payment method, loyalty card, and possibly personal information, such as the name of the consumer. This information along with information about the merchant may be aggregated or collected at the POS terminal and routed to the system or server of the present invention or otherwise a third party affiliate of an entity managing the system of this invention. In other embodiments when the purchase transaction occurs over the Internet, the information associated with the purchase transaction is collected at a server providing an interface for conducting the Internet transaction. In such an embodiment, the consumer enters product, payment, and possibly personal information, such as a shipping address, into the online interface, which is then collected by the server. The server may then aggregate the transaction information together with merchant information and route the transaction and merchant information to the system of the present invention. It will be further be understood that the information associated with the purchase transaction may be received from any channel such as an ATM, Internet, peer-to-peer network, POS, and/or the like.

Embodiments of the present invention address the above needs and/or achieve other advantages by providing apparatus (e.g., a system, computer program product, and/or other devices) and methods for an integrated entity resource distribution device set-up and deliver platform for distribution of devices to an entity or merchant. Entities want to typically provide new and modern resource acceptance at their location. Resource acceptance devices may be POT devices for face-to-face transactions or for e-commerce, card not present, applications for online payments.

When the entity accepts those types of payments, the entity has to be identifiable on an entity payment platform. The platform must also have access to and be provided the entity payment routing information. This set up process for an entity is known as activation and on-boarding of the entity in order to accept a different or new type of resource acceptance, such as digital payments.

In order to perform the devices to accept various resources via a resource acceptance device, the device may need to have appropriate software and hardware installed in specific order in order to function. As such, several different types of resource acceptance devices may be generated depending on the type of entity (restaurant, on-line, brick-and-mortar, or the like) and where/how the entity may be using the device (behind counter, on counter, or the like). Once a type of resource acceptance device is determined, the device may be loaded to have multiple pieces of software on it prior to delivery to the entity.

The system platform instructs the sequence of installation of software and what software gets placed on what resource acceptance device when during the build and delivery process. The platform then ties the software with the entity and the resource acceptance device identifies that ties it directly to a financial institution to allow for price and processing. Currently, there is no way to intelligently walk through correct loading and correlating of subcomponents onto a device and make it work correctly without entity setup and integration with other merchant devices.

Figure 1:
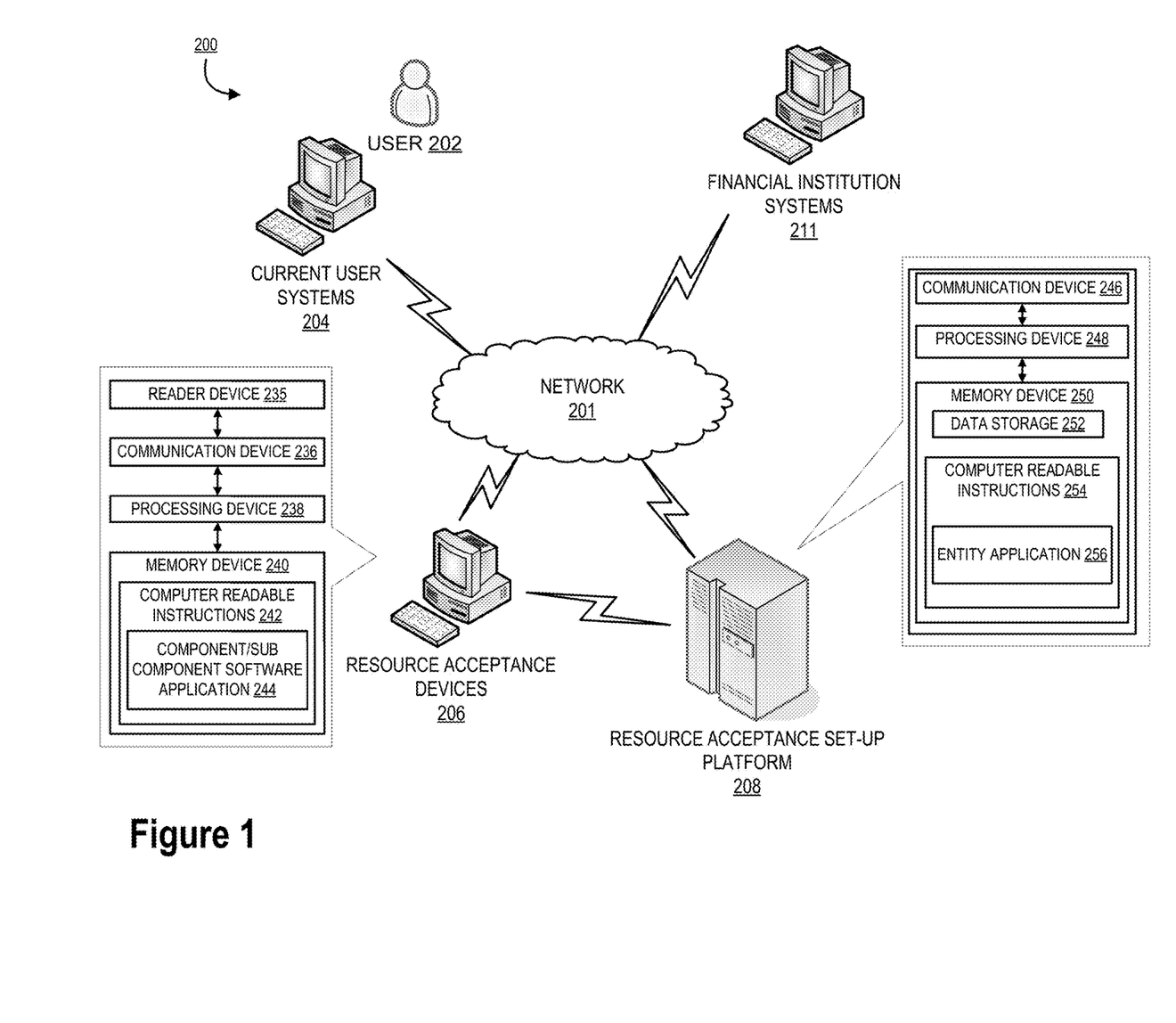
FIG. 1 provides an integrated entity resource acceptance device set-up and deployment system environment, in accordance with various embodiments of the invention.

FIG. 1 provides an integrated entity resource acceptance device set-up and deployment system environment 200, in accordance with various embodiments of the invention. As illustrated in FIG. 1, the resource acceptance set-up platform 208 is operatively coupled, via a network 201 to the current user systems 204, financial institution systems 211, and the resource acceptance device(s) 206. In this way, the resource acceptance set-up platform 208 can send information to and receive information from the current user systems 204, financial institution systems 211, and the resource acceptance device(s) 206 to facilitate the entity wide application building, servicing, and deployment.

FIG. 1 illustrates only one example of an embodiment of scalable service delivery environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network.

In some embodiments, the user 202 is an individual that an affiliation with the entity. In some embodiments, the user 202 may be an associate, employee, or the like associated with or interacting with current user systems and resource acceptance devices. In some embodiments, the user 202 may be an individual or business with a relationship with the use or maintenance of software, systems, and/or programs associated with the entity. Furthermore, multiple individuals or entities may comprise a user 202.

FIG. 1 also illustrates current user systems 204. The current user systems 204 are operatively coupled to the resource acceptance set-up platform 208, financial institution systems 211, and/or the resource acceptance device(s) 206 through the network 201. The current user systems 204 are independent systems with devices that perform a function associated with the entity, such as security, payroll, time management, product logistics and stocking, or the like. The current user systems 204 may have the same or similar components to the devices described below for the resource acceptance set-up platform 208 and/or the resource acceptance device(s) 206 (e.g., communication device, processing device, and memory device). Therefore, the current user systems 204 may communicate with the resource acceptance set-up platform 208, financial institution systems 211, and/or the resource acceptance device(s) 206 in the same or similar way as described with respect to each system.

The current user systems 204, in some embodiments, is comprised of systems and devices that allow for a user 202 to perform functions of the entity. Although only a single current user system 204 is depicted in FIG. 1, the system environment 200 may contain numerous user systems 204, as appreciated by one of ordinary skill in the art.

As illustrated in FIG. 1, the resource acceptance set-up platform 208 may include a communication device 246, processing device 248, and a memory device 250. The processing device 248 is operatively coupled to the communication device 246 and the memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. The processing device 248 uses the communication device 246 to communicate with the network 201 and other devices on the network 201, such as, but not limited to the current user systems 204, financial institution systems 211, and/or resource acceptance device(s) 206 over a network 201. As such, the communication device 246 generally comprises a modem, server, or other device for communicating with other devices on the network 201.

The resource acceptance set-up platform 208, is responsible for setting up and configuring resource acceptance devices for the entity. In this way, the resource acceptance set-up platform 208 may communication with a user 202 associated with the entity to configure and distribute resource acceptance devices to the user 202 for deployment at the entity for resource acceptance.

As further illustrated in FIG. 1, the resource acceptance set-up platform 208 comprises computer-readable instructions 254 stored in the memory device 250, which in one embodiment includes the computer-readable instructions 254 of an entity application 256. In some embodiments, the memory device 250 includes data storage 252 for storing data related to the entity application 256 including but not limited to data created and/or used by the entity application 256.

In the embodiments illustrated in FIG. 1 and described throughout much of this specification, the entity application 256 may identify entities for resource acceptance device deployment, ensure correct loading of software and firmware onto resource acceptance devices, confirm order and location of loading of software and firmware to components and subcomponents of the resource acceptance devices, and monitor/track resource acceptance devices upon deployment at an entity.

In some embodiments, the entity application 256 receives maintenance updates for applications, software, and firmware deployed on the resource acceptance devices. The entity application 256 may receive maintenance update from vendors and deploy the updates on generated and configured resource acceptance devices. The maintenance updates may be received from a vendor via one or more vendor systems. In this way, when a vendor has a fix, update, new product release, or the like, the vendor may communicate via a vendor system the update to the resource acceptance set-up platform 208 via the network 201. Each of the one or more updates may be sent directly to the resource acceptance set-up platform 208 for providing maintenance to each of the one or more resource acceptance devices 206.

In some embodiments, the entity application 256 maintains entity information technology. As such, the resource acceptance set-up platform 208 may maintain and update any and all application software and hardware associated with an entity with respect to resource acceptance devices 206. As such, the entity application 256 manages all application software instillations and updates associated with the entity resource acceptance devices.

Furthermore, the entity application 256 may communicate with the resource acceptance device(s) 206 to monitor the use and activity of each resource acceptance device deployed at the entity location to confirm usage, provide usage recommendations, and the like to the user 202 associated with the entity.

As illustrated in FIG. 1, the resource acceptance device(s) 206 generally comprises a communication device 236, a processing device 238, and a memory device 240. The processing device 238 is operatively coupled to the communication device 236 and the memory device 240. The processing device 238 uses the communication device 236 to communicate with the network 201 and other devices on the network 201, such as, but not limited to the resource acceptance set-up platform 208, the current user systems 204, and/or the financial institution systems 211. As such, the communication device 236 generally comprises a modem, server, or other device for communicating with other devices on the network 201.

As further illustrated in FIG. 1, the resource acceptance device(s) 206 comprises computer-readable instructions 242 stored in the memory device 240, which in one embodiment includes the computer-readable instructions 242. In some embodiments, the memory device 240 includes database storage for storing data related to the component/sub-component software application 244 including but not limited to data created and/or used by the component/sub-component software application 244.

In the embodiments illustrated in FIG. 1 and described throughout much of this specification, the component/sub-component software application 244 identifies entity needs, receives software and firmware updates from the platform, and monitors usage of the resource acceptance devices 206.

Once deployed, the component/sub-component software application 244 may also process, in some embodiments, the maintenance updates for the software applications. In this way, the component/sub-component software application 244 may determine the appropriate location for the maintenance update such as a within a component or sub-component. Subsequently, the component/sub-component software application 244 may direct the maintenance update to the appropriate location and initiate the installation of the update. In some embodiments, the component/sub-component software application 244 may code a tracking module and incorporate the tracking module into the maintenance update.

FIG. 1 also illustrates one or more financial institution systems 211. The financial institution systems 211 are operatively coupled to the resource acceptance set-up platform 208, current user systems 204, and/or the resource acceptance device(s) 206 through the network 201. The financial institution systems 211 have systems with devices the same or similar to the devices described for the resource acceptance set-up platform 208 and/or the resource acceptance device(s) 206 (e.g., communication device, processing device, and memory device). Therefore, the financial institution systems 211 may communicate with the resource acceptance set-up platform 208, current user systems 204, and/or the resource acceptance device(s) 206 in the same or similar way as previously described with respect to each system. The financial institution systems 211, in some embodiments, is associated with a financial institution or payment rail for processing of payments received at the entity and depositing those payments into the entity account.

FIG. 1 depicts only one financial institution system 211 within the computing system environment 200, however, one of ordinary skill in the art will appreciate that a plurality of financial institution systems 211 may be communicably linked with the network 201 and the other devices on connected to the network 201, such that each network system 211 is communicably linked to the network 201 and the other devices on the network 201.

Figure 2:
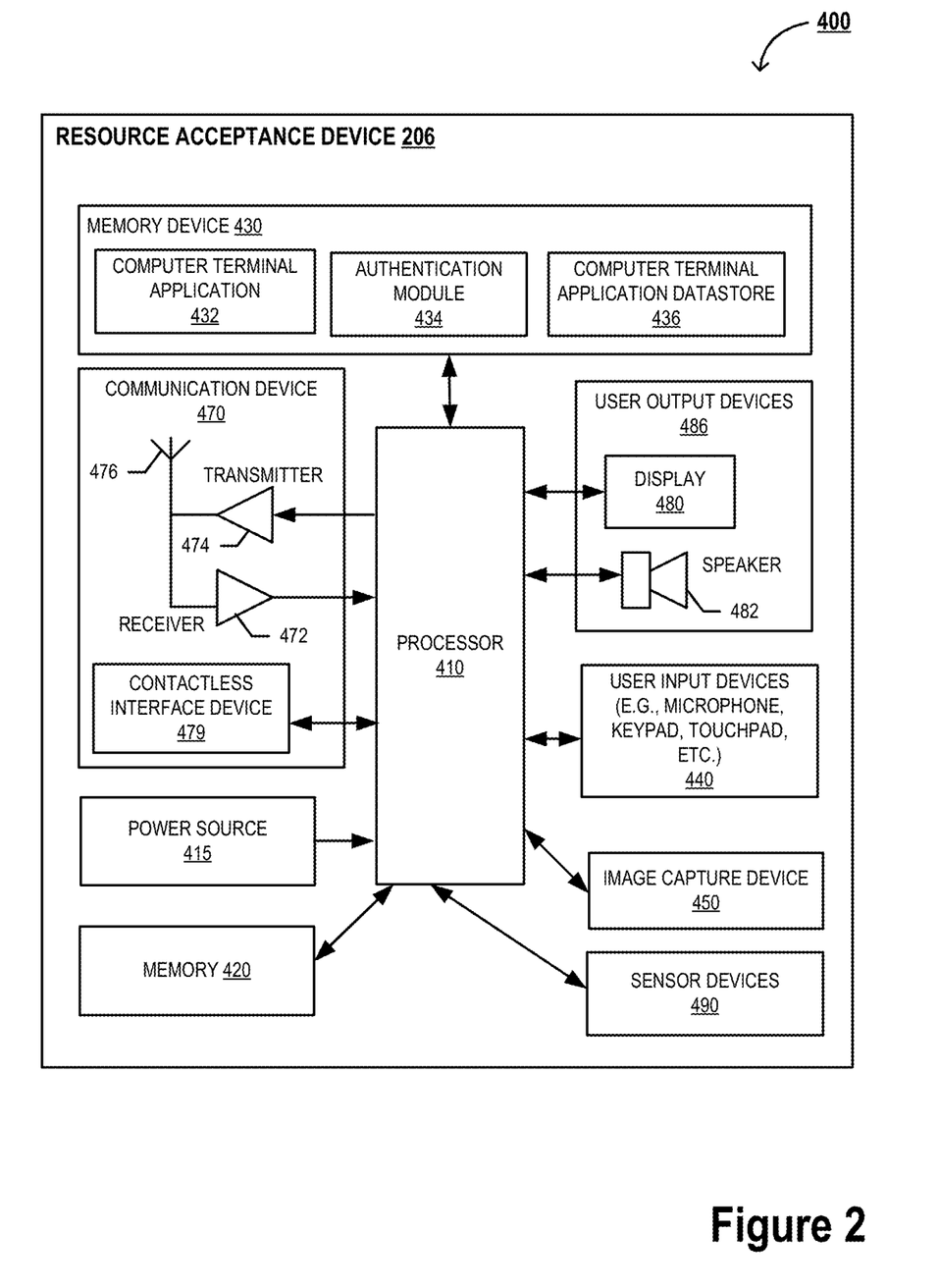
FIG. 2 provides a block diagram of a block diagram of a resource acceptance device, in accordance with embodiments of the invention.

FIG. 2, illustrates a block diagram 400 of the resource acceptance device 206 system, in accordance with some embodiments of the invention. As discussed previously, the resource acceptance device 206 is configured to facilitate performance of user activities, and is configured to provide or facilitate real-time interactive sessions for the user, either on the mobile device of the user or on the terminal itself, using one or more communication channels established via the network to provide an entity with the processing of payments. The resource acceptance device 206 typically includes a processing device or a processor 410, memory device 430, storage memory 420 or datastore 420, and a communication device 470. As such, the resource acceptance device 206, and the processor 410 is particular, is configured to perform at least a portion of the steps of the embodiments described herein, either based on executing computer readable instructions stored in the memory device 430, and/or based on receiving instructions, indications, or signals from other systems. In some embodiments, the processing system is configured to transmit control instructions to, and cause the processing device 410 to perform one or more steps of the embodiments presented herein. For example, the processing system may detect a trigger event and transmit an indication to the processing device 410. In response to receiving the control signal from the system, the processing device 410 may initiate a presentation of environment parameters.

As discussed previously, "resource acceptance device" or "terminal" as used herein may refer to one or more electronic devices that facilitate one or more user activities or transactions, may comprise a unique device identification, and also may comprise software or hardware for the completion of a transaction. In some embodiments, the computer terminal may refer to any device (or networked device) that is configured to operatively communicate with a mobile device via a network. Typically, a computer terminal is configured to facilitate performance of one or more user activities by establishing an "interactive session" between a user and the computer terminal, and more specifically between the user's mobile device and the computer terminal (e.g., via a secure wireless communication channel). In some embodiments the computer terminal refers to devices that facilitate execution of non-financial user activities or transactions, for example, smart devices such as, secure doors with authentication features, smart learning walls, smart televisions, tablets, smart automobiles, and the like, mobile devices, check-in terminals for various industries, Automated Teller Machines (ATMs), Point of sale (POS) devices, vending machines, checkout registers, ticket vending machines, automated retail transaction devices, banking terminals in a financial institution, financial institution servers, merchant servers, sensors, transmitter devices, and other devices that involve user activities or transactions in one form or another, or may comprise technology elements and/or functionality of one or more aforementioned devices, or a suitable combination of the aforementioned devices/apparatuses. In some embodiments the computer terminals enable execution of both financial and non-financial transactions/activities (e.g., a computer terminal may be a suitable combination of any of the aforementioned terminal devices with respect to their features, design and/or function).

The processing device 410 may generally refer to a device or combination of devices having circuitry used for implementing the communication and/or logic functions of the resource acceptance device 206. For example, the processing device 410 may include a control unit, a digital signal processor device, a microprocessor device, and various analog-to-digital converters, digital-to-analog converters, and other support circuits and/or combinations of the foregoing. Control and signal processing functions of the resource acceptance device 206 may be allocated between these processing devices according to their respective capabilities.

The resource acceptance device 206 may further include various components/devices in operative communication with and/or controlled by the processor 410, such as user output devices 486, user input devices 440, a network communication interface 479 (such as a contactless interface 479), a power source 415, and the like. Furthermore, in some embodiments, the processor 410 is operatively coupled to and is configured to control other components/devices of the resource acceptance device 206, such as an image capture device 450, sensor devices 490, and the like. These components and devices are described in detail below.

The memory device 430 and the storage memory 420 may generally refer to a device or combination of devices that store one or more forms of computer-readable media for storing data and/or computer-executable program code/instructions. In some embodiments, the storage memory 420 is integral with the memory device 430. In some embodiments, the memory device 430 comprises a non-transitory, computer readable storage medium. For example, the memory device 430 and/or the storage memory 420 may include any computer memory that provides an actual or virtual space to temporarily or permanently store data and/or commands provided to the processing device 410 when it carries out its functions described herein.

As illustrated by FIG. 2, the memory device 430 typically comprises a computer terminal application 432 (also referred to as a terminal application), an authentication module 434, a computer terminal application datastore 436 stored therein. In some embodiments, the authentication module 434 is integral with the computer terminal application 432. In some embodiments, the computer terminal applications 432 and/or the authentication module 434 may be executable to initiate, perform, complete, and/or facilitate one or more portions of any embodiment described and/or contemplated herein, either independently or in response to receiving control instructions from the processing system. In some embodiments, the computer terminal application/module 432 comprises computer readable instructions stored in the memory device 430, which when executed by the processing device 410, are configured to cause the processing device 410 to perform one or more steps of the embodiments presented herein, and/or cause the processing device to transmit control instructions to other components of the device and other devices/systems in the network to cause them to perform the steps. Generally, the computer terminal application 432 is executable to receive activity instructions from the user and perform user activities and the various steps described herein. In some embodiments, the computer terminal application 432 comprises a personal digital assistant for interfacing with the user at the terminal. The computer terminal application 432 may be coupled to a computer terminal application datastore 436 for storing application data as the user activity is being performed. The computer terminal application datastore 436 may store the application data temporarily for the predetermined duration of the execution of the activity (such as a memory buffer, or cache memory), or permanently.

The resource acceptance device 206 may require users to identify and/or authenticate themselves before the resource acceptance device 206 may initiate, perform, complete, and/or facilitate a user activity. For example, in some embodiments, the resource acceptance device 206 is configured (and/or the computer terminal application 432 is executable) to authenticate a computer terminal user based at least partially on a computer terminal debit card, smart card, token (e.g., USB token, etc.), username, password, PIN, biometric information, and/or one or more other credentials that the user presents to the resource acceptance device 206. Additionally or alternatively, in some embodiments, the resource acceptance device 206 is configured to authenticate a user by using one-, two-, or multi-factor authentication. For example, in some embodiments, the resource acceptance device 206 requires two-factor authentication, such that the user must provide a valid debit card and enter the correct PIN associated with the debit card in order to authenticate the user to the resource acceptance device 206. However, either alternatively or in addition to the aforementioned authentication features, the resource acceptance device 206 may require biometric authentication of the user before initiating, performing, completing, and/or facilitating a user activity.

In some embodiments, the authentication module 434 comprises computer readable instructions that when executed by the processing device 410 cause the processing device to perform one or more functions and/or transmit control instructions to other components or devices to perform one or more authentication steps described herein. These authentication steps typically include requesting authentication credentials from the user via the user output devices 486 (for example, based on determining the desired authorization level for the user activity), activating pertinent sensors and devices for receipt of the credentials (sensor devices 490/image capture devices 450 for biometric credentials, card reader devices 440 for reading magnetic strips of the user's card(s), contact less interface device 479 for receiving authentication tokens from a user device via NFC channels, and the like), receiving authentication credentials, validating the credentials (for example based on retrieving user credentials from the datastore 436, memory 420, processing system, and/or database), and the like. That said, as shown, the processing device 410, in turn, is operatively connected to and is also configured to control and cause the communication device 470, the memory device 430, and other components described herein to perform one or more functions, at least in part.

The communication device 470 may comprise a modem 471 (not illustrated), a receiver 472, a server 473 (not illustrated), a transmitter 474, transceiver, and/or another device for communicating with other devices and systems on the network. The communication device 470 may further comprise a contact, contactless, wireless and/or wired interface that is configured to establish communication between components of the resource acceptance device 206, between the resource acceptance device 206 and other devices. In this regard, the communication interface 470 comprises a transmitter 474, a receiver 472, a broadcasting device 476 to transmit and receive signals from corresponding devices via a suitable transmission medium or a communication channel. In some embodiments, the resource acceptance device 206 is configured to be coupled/connected to other devices and systems via wired communication channels. In other embodiments, the resource acceptance device 206 is configured to be coupled/connected to other devices via a wireless channel. In this regard, the wireless communication channel may comprise near field communication (NFC), communication via radio waves, communication through the internet, communication via electromagnetic waves and the like. The communication device 470 may further comprise a contactless interface device 479 for establishing contactless communication with other devices, such as the user device. Here, the resource acceptance device 206 may include a transceiver, i.e., one or more antennas and and/or other electronic circuitry, devices, and software, for receiving data when a device is held close to or tapped at a suitable location of the resource acceptance device 206. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 474 and receiver 472 may transmit and receive radio frequency signals, respectively, from the resource acceptance device 206 within a distance of up to approximately 25 cm, and from 0-20 cm, such as from 0-15 cm, and 0-10 cm, and the like.

Establishing the communication channels may also include signaling information in accordance with the air interface standard of the applicable cellular system of the wireless telephone network that may be part of the network. In this regard, the resource acceptance device 206 may be configured to operate with one or more air interface standards, communication protocols, modulation types, and access types. By way of illustration, the resource acceptance device 206 may be configured to operate in accordance with any of a number of first, second, third, and/or fourth-generation communication protocols and/or the like. For example, the resource acceptance device 206 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The resource acceptance device 206 may also be configured to operate in accordance with non-cellular communication mechanisms, such as via a wireless local area network (WLAN) or other communication/data networks The user interface of the resource acceptance device 206 may include user input devices 440 and user output devices 486, as illustrated by FIG. 2. The user interface of the resource acceptance device 206 is typically configured to facilitate the interactive sessions with the user. The user output devices 486 typically include a display 480 (e.g., a liquid crystal display, a touchscreen display, and/or the like) which is operatively coupled to the processing device 410. In some embodiments, where the resource acceptance device 206 requests the user's signature (if needed), the display may also serve as a touchpad input device to input the user's signature via a stylus. Other output devices may include one or more LEDs or an audio speaker 482, both of which may indicate to the user various steps of a user activity. The output devices 486 including the display 480 typically provide instructions and information to the user, regarding the user activity and steps associated with the user activity. The user interface may include any number of user input devices 440 allowing the resource acceptance device 206 to transmit/receive data to/from the user, such as a keypad, keyboard, touch-screen, touchpad, microphone, mouse, joystick, other pointer device, button, soft key, and/or other input device(s). A printer that can print paper receipts may also be incorporated into the resource acceptance device 206.

As illustrated by FIG. 2, the computer terminal may further comprise an image capture device 450. The image capture device 450 typically comprises cameras and other audio, video and image capture devices. The image capture device 450 is configured to capture images and/or video streams, typically in real-time, of a predetermined proximity area in the vicinity of the resource acceptance device 206 location. The images and/or video streams may be analyzed by the resource acceptance device 206 to determine the presence and position of the user, other individuals or objects and their movement in the proximity area, to identify the user for authentication or facial recognition purposes, and the like. In some embodiments, the system is configured to present a customized interface for the user based on identifying the user using facial recognition.

In some embodiments, the computer terminal further comprises sensor devices 490. In some embodiments, the processor 410 communicates with, transmits instructions, and/or receives signals from the sensor devices 490, in real-time for detecting the presence of the users or other individuals, determining user location, capturing authentication credentials for the user, determining parameters associated with the user, determining trigger events, capturing one or more parameters associated with the environment or physical location of the resource acceptance device 206, and the like. These sensor devices may be contact type sensors that determine the presence of the user or object based on contact, or non-contact type sensors that detect distant users or objects. In some embodiments, the sensor devices 490 of the computer terminal are similar to the sensor devices described previously, for determining the absolute or relative position, location, and proximity of the user, other individuals, or predetermined objects (such as vehicles, and vehicle features like contours of windows), within a predetermined proximity area. For example, the sensor devices 490 may comprise ultrasonic sensors, optical sensors, photoelectric sensors, capacitance sensors, inductive proximity/position sensors, visual capture devices (as described with respect to image/visual capture devices 450), and the associated transducers, transmitter and modulators, described in detail previously.

In some instances, the sensor devices 490 comprise biometric sensors for capturing parameters associated with the user, such as fingerprint scanners, voice recognition sensors, facial recognition sensors, user stress level sensors and the like. These biometric sensors 490 are configured to retrieve, receive, analyze and or validate biometric credentials associated with the user. In this regard, the biometric sensors 490 may comprise optical sensors, ultrasonic sensors, and/or capacitance sensors. The biometric sensors may further comprise radio frequency, thermal, pressure, piezo-resistive/piezoelectric, microelectromechanical sensors, and the like.

Figure 3:
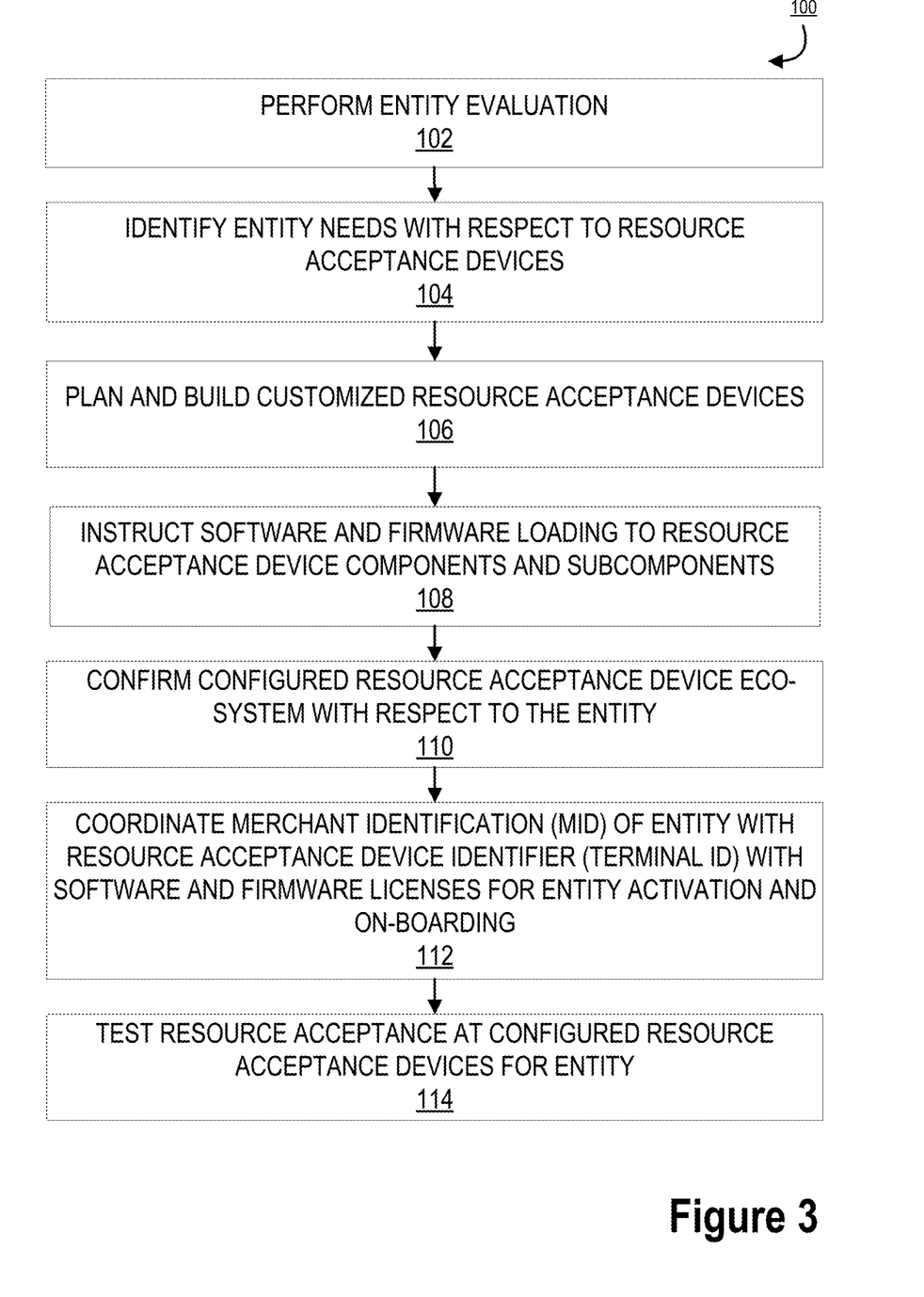
FIG. 3 provides a high level process flow illustrating setting up resource acceptance devices for entity utilization via the resource acceptance set-up platform, in accordance with embodiments of the invention.

FIG. 3 provides a high level process flow illustrating setting up resource acceptance devices for entity utilization via the resource acceptance set-up platform 100, in accordance with embodiments of the invention. As illustrated in block 102, the process 100 is initiated by performing an entity evaluation. In this way, the system confirms that the entity meets criteria for accepting and providing the entity with resource acceptance devices via the program. This evaluation may identify the type of merchant the entity is, the products the entity sells or offers, and the like. As illustrated in block 104, once the entity is evaluated, the system identifies the entity needs with respect to resource acceptance devices. There are various types of resource acceptance devices, such as mobile, on-counter, behind counter, or the like. Furthermore, there are different components of resource acceptance devices, these may include card readers, chip readers, NFC readers, display screens, touch screens, access to a cash register, card not present transaction capabilities, and the like.

As such, the system may determine the entity's needs with respect to the type of resource acceptance devices the entity may need based on the entity location, products, store layout, digital needs, online presence, and the like. Furthermore, based on the type of resource acceptance devices and user/customer interaction, each resource acceptance devices may require different software and firmware for various components of the resource acceptance devices. For example, card reader subcomponents may need to have different software requirements for allowing for card reading and transmission of the card information for payment rail and payment completion than that of an interface associated with the resource acceptance devices.

Once the entity's needs are determined, the system confirms the resource acceptance devices with the entity and initiates a platform plan and build of the customized resource acceptance devices, as illustrated in block 106. In this way, the system instructs software and firmware loading to the resource acceptance devices and their components and subcomponents. Furthermore, the system may determine a specific order of software loading onto the resource acceptance devices in order to perform.

Next, as illustrated in block 110, the process 100 continues by confirming the configured resource acceptance device eco-system with respect to the entity. In this way, the system may confirm that the configured resource acceptance devices will integrate into the entity's currently eco-system, such as other devices within the entity eco-system.

Once confirmed, the process 100, continues by coordinating the entity merchant identification (MID) number with the resource acceptance devices identifier (terminal ID) with the loaded software and firmware licenses for entity activation and on-boarding, as illustrated in block 112. Furthermore, the system may match the identification numbers with the payment rail for utilization of the resource acceptance devices for processing of payments to the entity for customer completion of a purchase.

Finally, as illustrated in block 114, the process 100 is finalized by testing resource acceptance and functionality on the configured resource acceptance devices to confirm entity utilization prior to deliver. As such, the system confirms that the resource acceptance devices are operational within the entity setting prior to deliver for confirmation of seamless operation at entity location.

Figure 4:
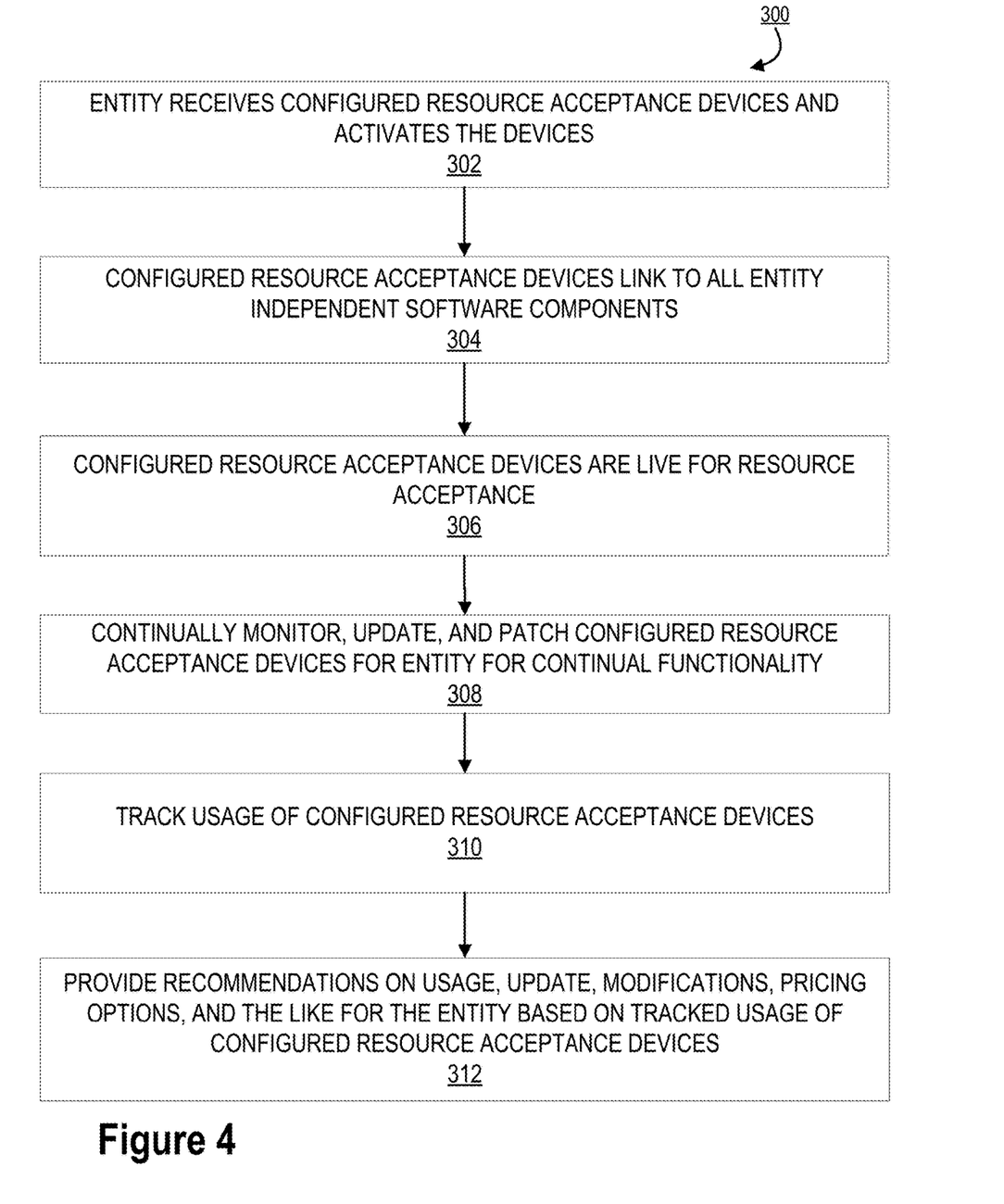
FIG. 4 provides a high level process flow illustration activation and utilization of the resource acceptance devices at an entity location, in accordance with an embodiment of the invention.

FIG. 4 provides a high level process flow illustration activation and utilization of the resource acceptance devices at an entity location 300, in accordance with an embodiment of the invention. As illustrated in block 302, the process 300 is initiated when the entity receives the configured resource acceptance devices and activates the devices. In this way, based on the system testing, the activation and on-boarding of the configured resource acceptance devices at the entity location is instant upon activation.

Next, as illustrated in block 304, the process 300 continues by allowing for the configured resource acceptance devices to link to and integrate within the other entity independent software components. Upon activation and integration within the other entity independent software components, the configured resource acceptance devices are presented as live for resource acceptance at the entity location, as illustrated in block 306.

Once the resource acceptance devices have been activated at the entity location, the system may continue to monitor, update, and patch the configured resource acceptance devices for the entity in order to provide continual functionality to the resource acceptance devices for the entity, as illustrated in block 308.

As illustrated in block 310, the process 300 continues by tracking usage of the of the configured resource acceptance devices to identify the usage of the various resource acceptance devices within the entity and the usage of the components and subcomponents of the resource acceptance devices. Using this tracking information, the system may provide recommendations on usage, update, modifications, pricing options, and the like for the entity based on the tracked usage of the configured resource acceptance devices, as illustrated in block 312.

In some embodiments, in order for an entity to access and utilize new resource acceptance devices for receiving payments from one or more payment methods, the entity may require the resource acceptance devices to be activated and on-boarded. Furthermore, the entity may need to be identified on a merchant platform in order for the entity to receive payment from the transaction in the proper account and proper form.

The system may evaluate the entity for access to the platform. The system may then pick out the appropriate resource acceptance devices for the entity based on the entity's needs and the type of entity. The platform identifies the appropriate resource acceptance devices for the entity, then loads the appropriate software and firmware onto the resource acceptance devices for the entity. System instructs software to various components and subcomponents to device software typically has payments software and subcomponent of business management software.

The components and subcomponents, such as card readers, screens, touch pads, and the like each require specific software loaded at different intervals in order to properly process a payment from a customer to the correct payment rail to the entity account.

The system ensure that this data is loaded correctly and will interact appropriately with the entity current devices. The system may match the terminal ID, MID, and software for on-boarding of the entity for payment rail processing. This then authorizes the merchant and terminal ID as authorized for card network transaction for completion of the transaction.

The platform provides and intelligence sequence of software installs to specific components of the resource acceptance device. The platform also does all the integration and matching of the unique MID and terminal ID for system recognition to allow for pricing and processing. Furthermore, the platform performs real transaction testing in an entity testing environment to confirm instant usage for the entity when the entity installs the resource acceptance devices. Tracks usage of devices to provide entity data on device usage and recommendations.

Embodiments of the invention are directed to a system, method, or computer program product for an integrated entity resource distribution device set-up and deliver platform for distribution of devices to an entity for resource acceptance. An entity must be activated and on-boarded to accept resource acceptance and processing. The invention creates a platform for identification of entity needs with respect to resource acceptance devices. With this information the platform generates configured resource acceptance devices for the entity with correct components and sub-components. Furthermore, the system integrate software and firmware in an appropriate sequence onto resource acceptance devices components and sub-components. The platform then ties the software with the entity and the resource acceptance device identifiers to allow for resource distribution processing for the entity to intelligently provide correct loading and correlating of subcomponents onto a device without entity setup and integration with other merchant devices.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, or the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for entity resource acceptance device set-up and distribution, the system comprising:
 a memory device with computer-readable program code stored thereon;
 a communication device;
 a processing device operatively coupled to the memory device and the communication device, wherein the processing device is configured to execute the computer-readable program code to:
  perform entity evaluation for resource acceptance devices;
  select resource acceptance devices for the entity and instruct software and firmware loading onto components and subcomponents of the selected resource acceptance devices, wherein the selected resource acceptance devices are determined based on the entity evaluation;
  confirm configured resource acceptance devices with instructed software and firmware and coordinate a merchant identification (MID) of the entity with a terminal identification (Terminal ID) of the resource acceptance device and with the instructed software and firmware for entity activation and on-boarding;
  test resource acceptance and functionality on the configured resource acceptance devices in an entity type environment to confirm entity utilization prior to delivery for confirmation of operation at entity location;
  recognize live deployed configured resource acceptance devices at the entity location;
  allow for the configured resource acceptance devices to link to and integrate within entity independent software components;
  perform continual monitoring and automatic patch and update deployment on the configured resource acceptance devices at the entity location for continued functionality;
  track usage of the configured resource acceptance devices including usage of components and sub-components of the configured resource acceptance devices; and
  provide recommendations on usage, modifications, and cost analysis for the configured resource acceptance devices.

2. The system of claim 1, wherein instructing software and firmware loading onto components and subcomponents of the selected resource acceptance further comprises instructing a timing and order of software and firmware loading.

3. The system of claim 1, wherein performing entity evaluation for resource acceptance devices further comprises identifying a location of the entity, a service industry of the entity, and resource acceptance device needs for the entity.

4. The system of claim 1, wherein the resource acceptance devices further comprise a device with components and subcomponents for accepting resources and initiating a payment processing to distribute resources to the entity.

5. The system of claim 1, wherein entity activation and on-boarding further comprises linking the entity to payment rails for completion of transactions and processing of payments via the resource acceptance devices.

6. The system of claim 1, wherein providing recommendations on usage, modifications, and cost analysis further comprises providing recommendations based on the tracking of the usage of the configured resource acceptance devices to determine underperforming or overperforming configured resource acceptance devices in order to modify the select resource acceptance devices for the entity.

7. A computer program product for entity resource acceptance device set-up and distribution, the computer program product comprising at least one non-transitory computer-readable medium having computer-readable program code portions embodied therein, the computer-readable program code portions comprising:
 an executable portion configured for performing entity evaluation for resource acceptance devices;
 an executable portion configured for selecting resource acceptance devices for the entity and instruct software and firmware loading onto components and subcomponents of the selected resource acceptance devices, wherein the selected resource acceptance devices are determined based on the entity evaluation;
 an executable portion configured for confirming configured resource acceptance devices with instructed software and firmware and coordinate a merchant identification (MID) of the entity with a terminal identification (Terminal ID) of the resource acceptance device and with the instructed software and firmware for entity activation and on-boarding;
 an executable portion configured for testing resource acceptance and functionality on the configured resource acceptance devices in an entity type environment to confirm entity utilization prior to delivery for confirmation of operation at entity location;
 an executable portion configured for recognizing live deployed configured resource acceptance devices at the entity location;
 an executable portion configured for allowing for the configured resource acceptance devices to link to and integrate within entity independent software components;
 an executable portion configured for performing continual monitoring and automatic patch and update deployment on the configured resource acceptance devices at the entity location for continued functionality;
 an executable portion configured for tracking usage of the configured resource acceptance devices including usage of components and sub-components of the configured resource acceptance devices; and
 an executable portion configured for providing recommendations on usage, modifications, and cost analysis for the configured resource acceptance devices.

8. The computer program product of claim 7, wherein instructing software and firmware loading onto components and subcomponents of the selected resource acceptance further comprises instructing a timing and order of software and firmware loading.

9. The computer program product of claim 7, wherein performing entity evaluation for resource acceptance devices further comprises identifying a location of the entity, a service industry of the entity, and resource acceptance device needs for the entity.

10. The computer program product of claim 7, wherein the resource acceptance devices further comprise a device with components and subcomponents for accepting resources and initiating a payment processing to distribute resources to the entity.

11. The computer program product of claim 7, wherein entity activation and on-boarding further comprises linking the entity to payment rails for completion of transactions and processing of payments via the resource acceptance devices.

12. The computer program product of claim 7, wherein providing recommendations on usage, modifications, and cost analysis further comprises providing recommendations based on the tracking of the usage of the configured resource acceptance devices to determine underperforming or overperforming configured resource acceptance devices in order to modify the select resource acceptance devices for the entity.

13. A computer-implemented method for entity resource acceptance device set-up and distribution, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

performing entity evaluation for resource acceptance devices;

selecting resource acceptance devices for the entity and instruct software and firmware loading onto components and subcomponents of the selected resource acceptance devices, wherein the selected resource acceptance devices are determined based on the entity evaluation;

confirming configured resource acceptance devices with instructed software and firmware and coordinate a merchant identification (MID) of the entity with a terminal identification (Terminal ID) of the resource acceptance device and with the instructed software and firmware for entity activation and on-boarding;

testing resource acceptance and functionality on the configured resource acceptance devices in an entity type environment to confirm entity utilization prior to delivery for confirmation of operation at entity location;

recognizing live deployed configured resource acceptance devices at the entity location;

allowing for the configured resource acceptance devices to link to and integrate within entity independent software components;

performing continual monitoring and automatic patch and update deployment on the configured resource acceptance devices at the entity location for continued functionality;

tracking usage of the configured resource acceptance devices including usage of components and subcomponents of the configured resource acceptance devices; and providing recommendations on usage, modifications, and cost analysis for the configured resource acceptance devices.

14. The computer-implemented method of claim 13, wherein instructing software and firmware loading onto components and subcomponents of the selected resource acceptance further comprises instructing a timing and order of software and firmware loading.

15. The computer-implemented method of claim 13, wherein performing entity evaluation for resource acceptance devices further comprises identifying a location of the entity, a service industry of the entity, and resource acceptance device needs for the entity.

16. The computer-implemented method of claim 13, wherein the resource acceptance devices further comprise a device with components and subcomponents for accepting resources and initiating a payment processing to distribute resources to the entity.

17. The computer-implemented method of claim 13, wherein entity activation and on-boarding further comprises linking the entity to payment rails for completion of transactions and processing of payments via the resource acceptance devices.

* * * * *